May 3, 1966     J. M. LICHTENBERG ETAL     3,248,946
RADIATOR SIGHT GAUGE
Filed Aug. 3, 1964
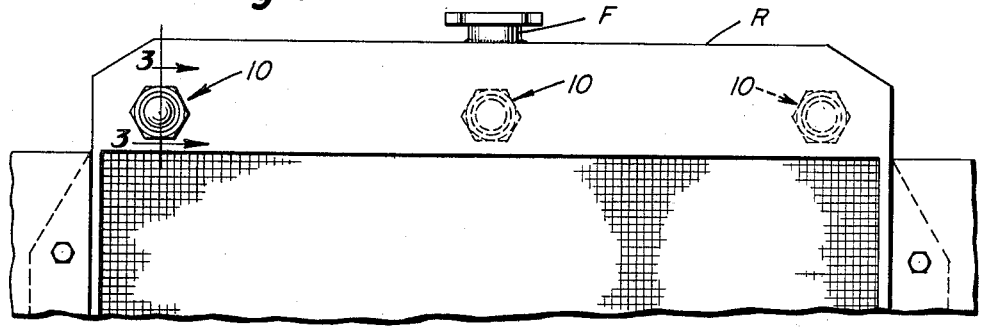
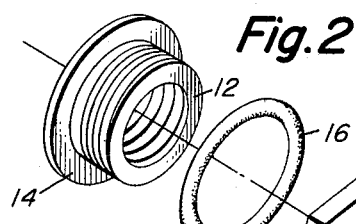
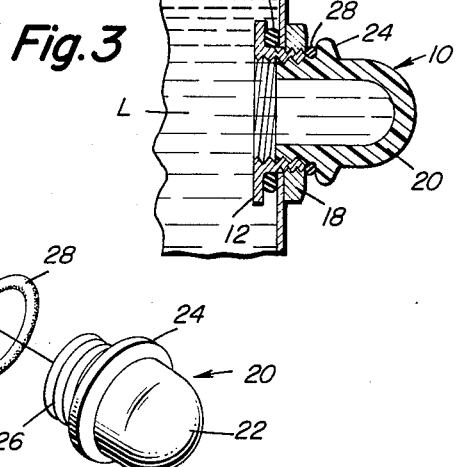
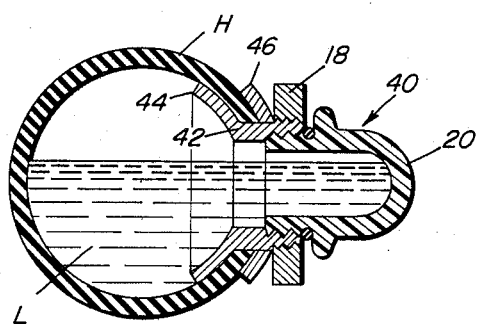
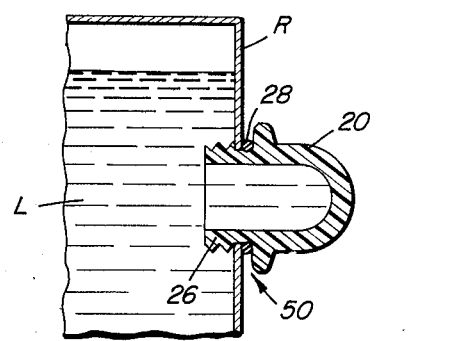
INVENTORS
Thomas R. Demyon
Jerome M. Lichtenberg
BY Walter G. Finch
ATTORNEY 3,248,946
RADIATOR SIGHT GAUGE
Jerome M. Lichtenberg, Twin Oaks and Hammond Ferry Road, Linthicum Heights, Md., and Thomas R. Demyon, 422 E. North Ave., Baltimore, Md.
Filed Aug. 3, 1964, Ser. No. 387,071
1 Claim. (Cl. 73—334)

This invention relates generally to indicating devices, and more particularly it pertains to improved sight gauges for motor vehicle radiators and the like.

The present practice of unscrewing the fill cap of a radiator to determine whether the level of cooling fluid is correct is objectional, especially because of the present practice of using pressurized systems to allow operation at higher temperatures. Besides being time consuming when a radiator cap is unscrewed, the release of pressure often causes a sudden and dangerous boil-over. Then, too, there always is the possibility of the cap not being replaced tightly enough to re-seal and is, therefore, inductive of a future boil-over after driving the vehicle a few miles.

Accordingly, it is an object of the present invention to provide a sight gauge for motor vehicle radiators which allows observation of the fluid level at a glance.

Another object of the invention is to provide an improved sight gauge which can be easily installed in existing radiators and readily replaced if it should become defective.

Other objects of this invention are to provide various embodiments of a sight gauge for automotive vehicle radiators which are economical to manufacture, easy to install without special tools, and which are reliable and efficient in operational use.

Other objects and attendant advantages of this invention will become more readily apparent and understood from the following detailed specification and accompanying single sheet of drawings in which:

FIG. 1 is a fragmentary front elevation of an automotive vehicle radiator showing one embodiment of an improved sight gauge incorporating features of this invention together with suggested mounting locations therefor;

FIG. 2 is an exploded view of the elements of one embodiment of the sight gauge of this invention of FIG. 1;

FIG. 3 is a vertical section taken on line 3—3 of FIG. 1;

FIG. 4 is a modification of the sight gauge showing the adaption of same to the hose connection of a radiator; and FIG. 5 is a simplified embodiment of the invention for use on thin wall radiators or where access to the interior is impossible.

Referring now to the details of the drawings, with special attention to FIGS. 1, 2 and 3 reference numeral 10 indicated generally an improved sight gauge. This sight gauge 10 consists of a threaded nipple 12 having a flange 14 on one end. An O-ring 16 and a nut 18 are provided to fit on this nipple 12.

The inside of nipple 12 is threaded to receive a transparent hollow plastic cap 20. This cap 20 has a generally hemispherical bulb 22 at one end, an enlarged flange 24 intermediate the ends, and a threaded hollow shank 26 at the other end.

FIG. 1 shows three preferred locations for mounting the sight gauge 10 on a radiator R. Access for inserting the nipple 12 and O-ring 16 is obtained to the interior of the radiator R through the usual fill pipe F or by removing a circulating hose, not shown, in the rear. It is necessary only to drill a hole of the proper size in the radiator tank from the front to receive this nipple and assemble the rest of the gauge 10 as shown in FIG. 3. Another O-ring 28 is inserted to bear between the flange 24 of the cap 20 and the nut 18 to provide a hermetic seal at this point.

It will be noted the liquid L in the radiator R will fill the sight gauge 10 if the level is correct. This can be seen through the transparent bulb of the cap 20.

Some radiator systems do not have a tank-like upper portion on the radiator itself and in such cases the embodiment 40 shown in FIG. 4 is employed. Here a radiator hose H at a relatively high level is selected and an aperture made therein on one side. An inside and outside threaded nipple 42 is forced through this hole from without.

This nipple 42 differs from the nipple 12 in that it has a flange 44 curved to fit the inside radius of the hose H.

A curved washer 46 is employed on the outside over the nipple 42 to fit the outer radius of the hose H. The previously mentioned nut 18, O-ring 28 and cap 20 complete this embodiment assembly.

Where there are thin wall radiators or where access to the interior is impossible, the embodiment 50 of the radiator sight gauge of FIG. 5 is used. Here, the cap 20 is self-threaded into a suitable size hole drilled in the radiator R. The thin metal thereof distorts sufficiently to form a single thread to receive the threaded shank 26 of the cap 20.

Obviously many modifications and variations of the present invention are possible in light of the above teachings. It is, therefore, to be understood that within the scope of the appended claim the invention may be practiced otherwise than as specifically described.

What is claimed is:

A sight gauge for detecting the presence of liquid in a liquid cooling system having a radiator hose, comprising nipple means having a peripheral flange positioned in the interior of said radiator hose and conforming to the curvature thereof and a shank extending transversely and exteriorly of said radiator hose, with said shank being externally and internally threaded, washer means conforming to the curvature of the exterior of said radiator hose and positioned thereagainst to encompass said shank, nut means in threaded engagement with the external threads of said shank for clamping against said washer means and thereby clamping said nipple means to said radiator hose, enclosure means having one end open and externally in threaded engagement with the internal threads of said shank, a transparent portion at the opposite end, and a peripheral flange intermediate said one end and said opposite end, and an O-ring positioned in sealing relationship between said second mentioned peripheral flange and the outer end of said shank of said nipple means.

References Cited by the Examiner

UNITED STATES PATENTS

| | | | |
|---|---|---|---|
| 735,078 | 10/1903 | Felsing et al. | 285—200 X |
| 1,773,756 | 8/1930 | Schlaich | 116—117 X |
| 2,374,142 | 4/1945 | Steven | 73—334 X |
| 2,611,481 | 9/1952 | Sargeant et al. | 220—82 X |
| 2,647,406 | 8/1953 | Sorensen | 73—334 |
| 2,662,405 | 12/1953 | Tapscott | 73—328 |
| 2,757,632 | 8/1956 | Wittlin | 73—331 X |
| 2,847,969 | 8/1958 | Woodruff | 116—117 |
| 2,917,924 | 12/1959 | Messick | 73—334 |
| 3,096,748 | 7/1963 | Harry | 73—323 X |

FOREIGN PATENTS

| | | |
|---|---|---|
| 167,827 | 6/1956 | Australia. |
| 275,467 | 6/1914 | Germany. |
| 566,954 | 1/1945 | Great Britain. |

ISAAC LISANN, *Primary Examiner.*

H. N. HAROIAN, *Examiner.*